United States Patent [19]

Fyson

[11] Patent Number: 5,384,036
[45] Date of Patent: Jan. 24, 1995

[54] EFFLUENT TREATMENT

[75] Inventor: John R. Fyson, London, United Kingdom

[73] Assignee: Eastman Kodak Company, Rochester, N.Y.

[21] Appl. No.: 984,417

[22] PCT Filed: Sep. 5, 1991

[86] PCT No.: PCT/EP91/01681
§ 371 Date: Mar. 4, 1993
§ 102(e) Date: Mar. 4, 1993

[87] PCT Pub. No.: WO92/04282
PCT Pub. Date: Mar. 19, 1992

[30] Foreign Application Priority Data

Sep. 7, 1990 [GB] United Kingdom ............... 9019606

[51] Int. Cl.$^6$ ................................. C02F 1/62
[52] U.S. Cl. ................. 210/724; 210/726; 210/908; 210/912
[58] Field of Search ............ 210/724, 725, 726, 727, 210/912, 908

[56] References Cited

U.S. PATENT DOCUMENTS

| | | | |
|---|---|---|---|
| 4,170,553 | 10/1979 | Lang et al. | 210/143 |
| 4,260,491 | 4/1981 | Cassidy et al. | 210/724 |
| 4,624,790 | 11/1986 | Kamperman et al. | 210/724 |
| 4,846,978 | 7/1989 | Leggert et al. | 210/748 |
| 5,008,017 | 4/1991 | Kiehl et al. | 210/724 |
| 5,160,631 | 11/1992 | Frost et al. | 210/724 |
| 5,173,157 | 12/1992 | Nevels | 210/724 |

FOREIGN PATENT DOCUMENTS 2110199A 6/1983 United Kingdom .

OTHER PUBLICATIONS

Abstract of Japanese Patent 51102355.
Abstract of Japanese Patent 51099854.
Abstract of Japanese Patent 51083068.
Abstract of Japanese Patent 51049564.
Abstract of German Patent 2446117.
Patent Abstracts of Japan, vol. 12 No. 209 (C-504) [3056] 15 Jun. 1988.

*Primary Examiner*—Peter A. Hruskoci
*Attorney, Agent, or Firm*—Sarah Meeks Roberts

[57] ABSTRACT

A method of treating chemical liquid, and in particular photographic effluent, to render it more environmentally acceptable, by the addition to an alkaline solution of a salt of a Group III or transition metal to complex with and precipitate out a sequestering agent. Preferred salts are the sulphate, halide, oxychloride or nitrate of aluminium.

5 Claims, No Drawings

EFFLUENT TREATMENT

This invention relates to effluent treatment, and in particular to the removal of environmentally undesirable components from photographic processing machine effluents.

The overflow from a photographic processor will typically consist of polluting substances such as heavy metal ions, sequestering agents, substances that have a high oxygen demand and colour developing agents and their derivatives, straight disposal of which contravenes sewer regulations in many parts of the world. It is therefore essential that the overflow is converted by chemical or physical means to a liquid which can be poured into the sewer and/or a residual solid which can be removed to a place of safe and legal disposal.

Co-pending WO 92/04660 describes the sequential treatment of the effluent with chemical reagents which will cause differential precipitation of the pollutants.

The sequestering or complexing agents, such as EDTA and PDTA (ethylene- and propylenediamine tetraacetic acid respectively) are particularly undesirable in liquid effluent discharges as they tend to assist the dissolution of toxic heavy metals into the water as it flows toward municipal treatment works and as it seeps through the ground. They also often have a high oxygen demand. The use of an ion exchange resin to remove such an agent is already known, for example as disclosed in "Ion Exchange Resins" 1981, published by B.D.H. However this is costly, bulky and transfers the water problem elsewhere and can clean up only about 3 times the volume of the resin bed.

It has now been found that the addition of a salt of either a Group III or a transition metal to a photographic processing effluent that has previously been treated with alkali to remove iron and other heavy metals, precipitates the metal complex of the chelating or sequestering agents from this alkaline solution, whilst at the same time restoring the effluent to a more neutral pH without the addition of extra acid. This method has the advantage over the use of an ion-exchange resin in that the amount and cost of the materials is less and also no regeneration has to be carried out. The sequestering agent is rendered solid for land fill. It is not put back into water at a regeneration stage as for ion exchange.

According the present invention therefore there is provided a method of treating chemical liquid effluent to render it more environmentally acceptable, comprising the addition to an alkaline solution of a salt of a Group III or transition metal to complex with and precipitate out a sequestering agent.

Any soluble compound of the Group III or transition metal may be used but preferably the oxychloride, nitrate or most preferably the sulphate or halide, especially the chloride, of the metal is employed and aluminium chloride have been found to be particularly suitable. The salt used is dissolved in water and added in an amount of from 10 to 200, preferably 20 to 50 g/liter of effluent. If the amount of sequestering agent to be removed is known, an amount of from 1 to 3 times its weight is generally found appropriate.

The precipitate can then be removed by some mechanical means such as filtering, settling or centrifugation to provide an aqueous phase which is more environmentally acceptable and a solid waste which is readily disposable.

Conveniently precipitation of the chelating complex with, for example, the aluminium sulphate forms part of the sequential differential precipitation described in co-pending WO 92/04660 filed on even date herewith.

The effluent to be treated may, for example, have arisen from any of the photographic processes described in Item 308119, Research Disclosure December 1989, Industrial Opportunities Ltd., Hants., U.K., and especially sections XIX, XX and XXIII thereof.

Moreover the method of the invention may be applicable to remove free or weakly complexed chelating agents from any alkaline solution in other non-photographic industrial applications.

The invention will now be described with reference to the following Example which does not in any way limit the scope of the invention.

EXAMPLE

A seasoned bleach-fix suitable for processing a low silver coating weight paper, was prepared by mixing the following developer and bleach-fix replenisher in the ratio of 3:5.

| Developer | |
|---|---|
| Anti-cal No. 5 | 0.6 ml |
| Potassium carbonate | 25 g |
| Potassium chloride | 0.35 g |
| Diethylhydroxylamine | 5 ml |
| Colour developer (CD3) | 3.5 g |
| Hydrogen peroxide (30%) | 5 ml |
| Water to | 1 liter |
| pH adjusted to 10.3 | |
| Bleach-fix | |
| Sodium iron (III) EDTA | 32 g |
| Sodium thiosulphate ($5H_2O$) | 80 g |
| Sodium sulphite(anhydrous) | 32 g |
| Acetic acid(glacial) | 32 ml |
| Water to | 1 liter |
| pH | 5.5 |

This mixture was treated by adding 40 ml/l 30% hydrogen peroxide then waiting 2 minutes before adding 20 g/l activated charcoal and 28 g/l calcium hydroxide. After a further wait of 2 minutes an amount of aluminium sulphate ($16H_2O$) dissolved in 100 ml of water was added to 1 liter of the treated bleach fix. The amount added ranged from 0 to 30 g/l aluminium sulphate. The mixture was stirred for a further 2 minutes and then filtered through 'fast' filter paper. The resulting solutions were analyzed for EDTA by ion-chromatography. The results for different amounts of added aluminium sulphate added are shown in the table below.

| Aluminium sulphate added g/l | EDTA ppm |
|---|---|
| 0 | 8500 |
| 10 | 1800 |
| 20 | 22 |
| 30 | <1 |

The results clearly demonstrate that ETDA is being removed by the aluminum sulphate.

The pH of the solution to which 20 g/l aluminium sulphate had been added was found to be reduced to 5.6 from 12.3.

I claim:

1. A method of treating chemical liquid effluent to render it more environmentally acceptable, wherein said chemical liquid effluent comprises overflow from one or more photographic processors and includes sequestering agents and heavy metal ions, comprising
  adding an alkali to said chemical liquid effluent in an amount effective to remove said heavy metal ions;
  adding a salt of aluminum to said chemical liquid effluent in an amount of from 10 to 200 g/liter effluent, wherein said salt of aluminum complexes with and precipitates out said sequestering agents.

2. A method as claimed in claim 1, wherein said aluminum salt is a sulphate, a halide, an oxychloride or a nitrate.

3. A method as claimed in claim 1, wherein said aluminum salt is aluminum sulphate.

4. A method as claimed in claim 1, wherein said aluminum salt is aluminum chloride.

5. A method as claimed in claim 1, wherein said aluminum salt is added to said chemical liquid effluent in an amount of from 20 to 50 g/liter effluent.

* * * * *